US011138480B2

(12) United States Patent
Mazzarella et al.

(10) Patent No.: US 11,138,480 B2
(45) Date of Patent: Oct. 5, 2021

(54) SYSTEM AND METHOD FOR INTELLIGENT PATTERN RECOGNITION

(71) Applicant: Mutualink, Inc., Wallingford, CT (US)

(72) Inventors: Joseph R. Mazzarella, Tolland, CT (US); Michael S. Wengrovitz, Concord, MA (US)

(73) Assignee: Mutualink, Inc., Wallingford, CT (US)

( * ) Notice: Subject to any disclaimer, the term of this patent is extended or adjusted under 35 U.S.C. 154(b) by 43 days.

(21) Appl. No.: 16/541,251

(22) Filed: Aug. 15, 2019

(65) Prior Publication Data

US 2019/0370618 A1 Dec. 5, 2019

Related U.S. Application Data

(63) Continuation of application No. 15/491,257, filed on Apr. 19, 2017, now Pat. No. 10,410,097.

(Continued)

(51) Int. Cl.
*G06K 9/66* (2006.01)
*G06N 20/00* (2019.01)
(Continued)

(52) U.S. Cl.
CPC ........... *G06K 9/66* (2013.01); *G06F 16/5838* (2019.01); *G06K 9/00771* (2013.01);
(Continued)

(58) Field of Classification Search
CPC .... G06K 9/66; G06K 9/00771; G06K 9/4628; G06K 9/00979; G06F 16/5838; G06N 20/00; G08B 13/19641
(Continued)

(56) References Cited

U.S. PATENT DOCUMENTS 5,568,599 A * 10/1996 Yoshino ............... A61B 5/1176
345/630
5,600,767 A * 2/1997 Kakiyama ............... G06T 11/00
345/629

(Continued)

FOREIGN PATENT DOCUMENTS

EP   3002710 A1    4/2016
GB   2493580   *   2/2013
GB   2493580 A    2/2013

OTHER PUBLICATIONS

FBI—Fingerprints & Other Biometrics, 2 pages, printed May 25, 2016, from https://www.fbi.gov/about-us/cjis/fingerprints_biometrics/.

(Continued)

*Primary Examiner* — Sheela C Chawan
(74) *Attorney, Agent, or Firm* — Sterne, Kessler, Goldstein & Fox P.L.L.C.

(57) ABSTRACT

Embodiments include a system, method, and computer program product for distributed intelligent pattern recognition. Embodiments include a cooperative multi-agent detection system that enables an array of disjunctive devices (e.g., cameras, sensors) to selectively cooperate to identify objects of interest over time and space, and to contribute an object of interest to a shared deep learning pattern recognition system based on a bidirectional feedback mechanism. Embodiments provide updated information and/or algorithms to one or more agencies for local system learning and pattern updating recognition models. Each of the multiple agencies may in turn, update devices (e.g., cameras, sensors) coupled to the local machine learning and pattern recognition models.

20 Claims, 10 Drawing Sheets

Related U.S. Application Data

(60) Provisional application No. 62/346,062, filed on Jun. 6, 2016.

(51) Int. Cl.
*G06F 16/583* (2019.01)
*G06K 9/00* (2006.01)
*G06K 9/46* (2006.01)
*G08B 13/196* (2006.01)

(52) U.S. Cl.
CPC ....... *G06K 9/00979* (2013.01); *G06K 9/4628* (2013.01); *G06N 20/00* (2019.01); *G08B 13/19641* (2013.01)

(58) Field of Classification Search
USPC .................................. 382/157, 209; 348/143
See application file for complete search history.

(56) References Cited

U.S. PATENT DOCUMENTS

| | | | |
|---|---|---|---|
| 7,643,445 B2 | 1/2010 | Mills et al. | |
| 7,836,276 B2 | 11/2010 | Coon et al. | |
| 8,320,874 B2 | 11/2012 | Mills et al. | |
| 8,364,153 B2 | 1/2013 | Boucher et al. | |
| 8,578,387 B1 | 11/2013 | Mills et al. | |
| 8,811,940 B2 | 8/2014 | Boucher et al. | |
| 9,426,433 B1 | 8/2016 | Mazzarella et al. | |
| 9,615,218 B2 | 4/2017 | Mazzarella et al. | |
| 2005/0138328 A1 | 6/2005 | Moy et al. | |
| 2011/0130114 A1* | 6/2011 | Boudville | H04W 4/00 455/404.2 |
| 2013/0166711 A1 | 6/2013 | Wang et al. | |
| 2013/0198517 A1 | 8/2013 | Mazzarella | |
| 2015/0036883 A1 | 2/2015 | Deri et al. | |
| 2016/0188992 A1* | 6/2016 | Hiraga | G06K 9/4604 382/199 |

OTHER PUBLICATIONS

Kemelmacher-Shlizerman, I. et al., "Illumination-Aware Age Progression," 2014 IEEE Conference on Computer Vision and Pattern Recognition, IEEE Computer Society, 2014, 3334-41.
International Search Report and Written Opinion for PCT Application No. PCT/US2017/035261, 14 pages, dated Sep. 13, 2017.

\* cited by examiner

SYSTEM AND METHOD FOR INTELLIGENT PATTERN RECOGNITION

This application claims priority to U.S. Nonprovisional patent application Ser. No. 15/491,257, filed Apr. 19, 2017, entitled System and Method for Distributed Intelligent Pattern Recognition, which claims the benefit of U.S. Provisional Patent Application No. 62/346,062, filed on Jun. 6, 2016, titled System and Method for Distributed Intelligent Pattern Recognition, which are both hereby incorporated by reference in their entireties.

BACKGROUND

Field

The embodiments generally relate to a pattern detection and decision system, and more particularly, to providing a cooperative multi-agent detection system that contributes to a learning pattern recognition service.

Background

Conventional video management systems have a collection of surveillance cameras that record data that is collected and stored at a command center. When an event occurs, such as a robbery, recorded data from different video management systems are obtained and then analyzed to retrospectively understand the event. This can be particularly difficult when the video management systems belong to different institutions or agencies (e.g., local law enforcement, a regional airport).

When the event is a lost or stolen child, missing child information alerts or "Amber Alerts" are sent by means of electronic message networks such as email, short message service (SMS), and other information media that enable a recipient to read and see an associated image file of the missing child. Recipients including law enforcement personnel and the general public are expected to remember the image of the child and associated information. If the child is visually identified, an alert recipient reports the child's location to the appropriate law enforcement authorities by means of telephone, email, or website submission. It is often the case that stolen children are moved significant distances away from the location from which they were taken. As time passes without successfully recovering the child, the distance the child may be moved grows increasingly large. Moreover, as time passes, human memories fade, and the information loses its value and effect in the conscious awareness of recipients who may subsequently encounter the missing child.

U.S. Pat. No. 7,643,445, entitled Interoperable Communications System and Method of Use, issued on Jan. 5, 2010, and U.S. Pat. No. 8,320,874, entitled System and Method for Establishing an Incident Communications Network, issued on Nov. 27, 2012, both of which are incorporated by reference in their entirety, describe systems and methods for providing an interoperable communications system ("interop system," also referred to as an Incident Communications Network) including a plurality of otherwise disjunct or disparate communications systems that addressed the deficiencies of prior art systems. The '445 and '874 patents specifically describe methods for establishing an incident communications network that enables interoperable communications among communications resources controlled by multiple organizations during an incident involving emergency or pre-planned multi-organization communications wherein a communications resource is controlled by an administrator within an organization.

Additionally, U.S. Pat. No. 8,364,153, entitled Mobile Interoperability Workstation Controller Having Video Capabilities within an Incident Communications Network, issued on Jan. 29, 2013, ("Mobile IWC Patent") which is also incorporated herein by reference in its entirety, extends the concepts of the '445 and '874 patents. Namely, the Mobile IWC Patent includes enhanced video capture and streaming capabilities that are integrated with incident information and events to facilitate improved management and analysis of incidents or events in which an incident communications network is employed.

U.S. Pat. No. 8,811,940, entitled Dynamic Asset Marshalling Within an Incident Communications Network, issued on Aug. 19, 2014, ("Marshalling Patent") which is also incorporated herein by reference in its entirety, extends the concepts of the '445 and '874 patents. Namely, the Marshalling Patent provides systems and methods that marshal resources into an incident communications network based on a variety of factors, such as the type of incident and the type of resource being marshalled.

U.S. Patent Publication 2013/0198517, entitled Enabling Ad Hoc Trusted Connections Among Enclaved Communication Communities, filed on Mar. 13, 2013, ("Enclaved Application") which is also incorporated herein by reference in its entirety, extends the concepts of the '445 and '874 patents. Namely, the Enclaved Application presents systems and methods for dynamic access among secure communities, such as incident communications networks, that enable communication resources of a first secure community to securely access and/or utilize communication resources within other secure communities.

U.S. patent application Ser. No. 14/609,815, entitled Intelligent Formation and Management of Dynamic Talk Groups, ("Dynamic Talk Group Application") which is also incorporated herein by reference in its entirety, describes systems and methods for intelligent formation and management of dynamic talk groups. Embodiments include a discretionary sharing mechanism based on invitation and acceptance that allows for dynamic sharing of information in real time that enables secure communications among agencies.

U.S. patent application Ser. No. 14/642,325, entitled System and Methods for Biosensor-Triggered Multimedia Collaboration, ("Biosensor Trigger Application") which is also incorporated herein by reference in its entirety, describes systems and methods for using a biosensor worn by a user to trigger an event and activate a camera worn by the user to begin streaming and/or recording video data. Embodiments also initiate a real time multimedia collaboration session with the user wearing the biosensor and one or more designated parties.

BRIEF SUMMARY

What is needed is a system, method, and computer program product for distributed intelligent pattern recognition. Embodiments include a cooperative multi-agent detection system that enables an array of disjunctive devices (e.g., cameras, sensors) to selectively cooperate to identify objects of interest over time and space, and to contribute object of interest to a shared deep learning pattern recognition system based on a bidirectional feedback mechanism. Embodiments provide updated information and/or algorithms to one or more agencies for local system learning and pattern updating recognition models. Each of the multiple agencies may in turn, update devices (e.g., cameras, sensors) coupled to the local machine learning and pattern recognition models.

Embodiments include a system, method, and computer medium storage that electronically receive adaptations associated with a confirmation of a first potential match image with a first object of interest, where the confirmation is determined by an agency that originated a first search request of the first object of interest, and update an algorithm according to the adaptations received. Some embodiments electronically receive a second search request for a second object of interest, determine using the updated algorithm, a potential match image for the second object of interest, and transmit a request for confirmation of the second potential match image. After receiving a positive confirmation regarding the second potential match image and the second object of interest, some embodiments include updating the algorithm based on the positive confirmation received, and transmitting the updated algorithm (e.g., to a camera client device.) The first update may be updated based on a bidirectional feedback mechanism, and an embodiment may be an interactive visual identification exchange widget (IVIEW).

Some embodiments include second transmitting a request for a second algorithm, receiving the second algorithm, and replacing the algorithm with the second algorithm. In some embodiments the second search request includes a priority message comprising criteria that prioritizes the selection of algorithms for a search, where the criteria may include a camera resolution, a camera speed, and/or a type of the second object of interest. When the second object of interest is a human, embodiments may execute the updated algorithm to transform the second object of interest based on aging or changes in appearance. Further, some embodiments may query one or more databases associated with data mining applications to obtain images with metadata, correlate the second potential match image with associated metadata, and transmit location data to a display device, where the location data comprises a location of a camera client associated with the second potential match image.

BRIEF DESCRIPTION OF THE DRAWINGS/FIGURES

The accompanying drawings, which are included to provide a further understanding of the embodiments and are incorporated in and constitute a part of this specification, illustrate embodiments of the invention and together with the description serve to explain the principles of the invention. In the drawings.

DETAILED DESCRIPTION

Figure 1:
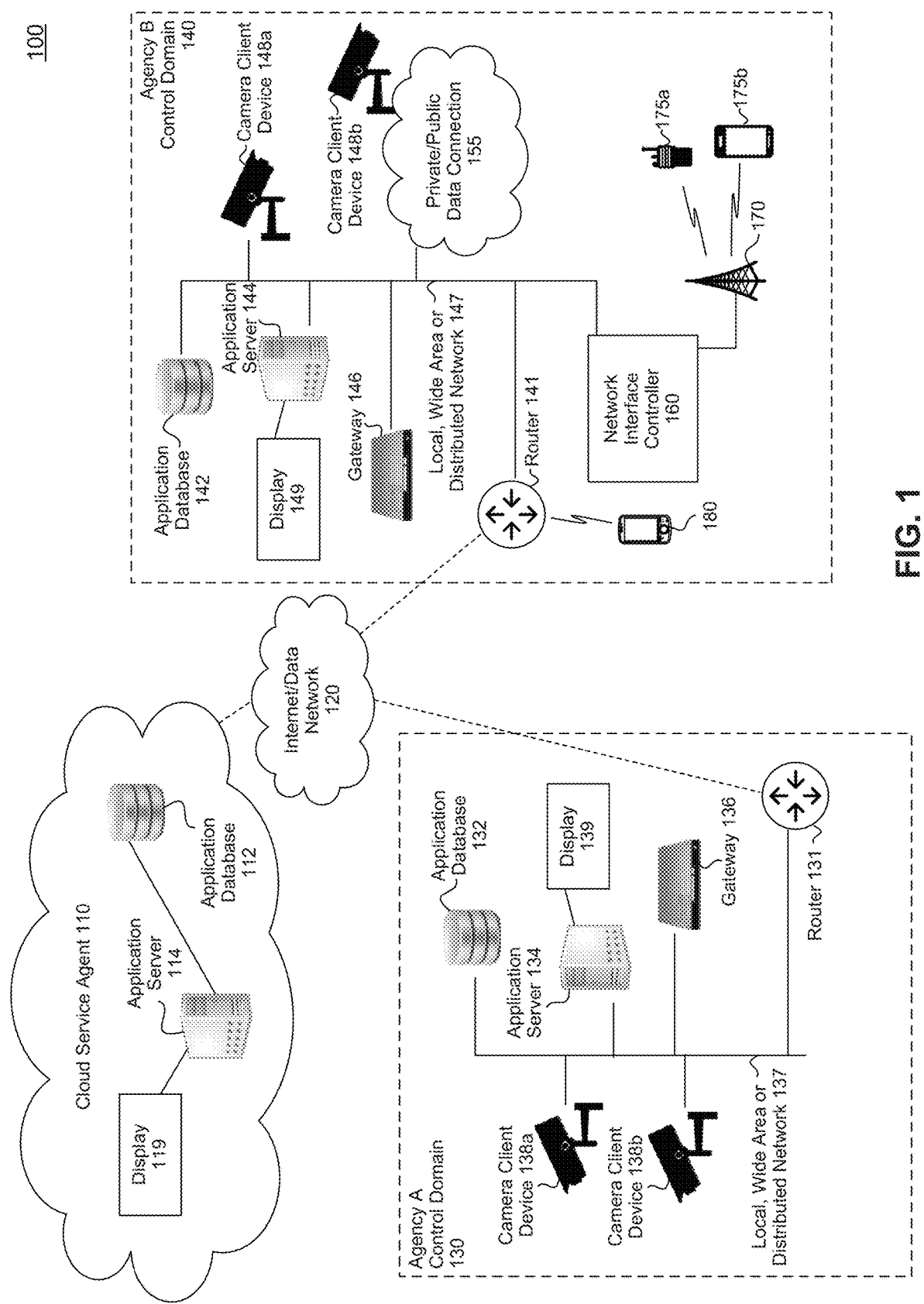
FIG. 1 illustrates a system according to an embodiment.

Embodiments include an array of disjunctive cameras that use a messaging system to share objects of interest for pattern analysis and recognition. Embodiments may employ a bidirectional feedback (e.g., feed forward and feed backward) mechanism for neural network learning through a shared computer processing system whereby pattern recognition accuracy is improved, computer pattern detection algorithms are adjusted, and modifications are sent to pattern recognition modules coupled to camera clients. Embodiments connect an originator agency of the object of interest with the agency jurisdiction where the object of interest is located using location and time information.

Embodiments enable a wide area cooperative intelligent pattern detection and recognition system. Utilizing many cameras equipped with and/or coupled to a pattern recognition module, embodiments enable the identification of the presence of an object of interest by utilizing image data of the object of interest. The object of interest may be a person (e.g., a lost/stolen child, a suspect, a missing person), a vehicle, a license plate, a gesture, an artifact, an animal (e.g., a lost dog), a collection of objects, including the composition, locations, arrangement, movement, symbols and patterns, etc. An object of interest may be represented by a set of data, an image, and/or a representational model. As a convenience and not a limitation, the examples refer to an image and a match image. For example, an object of interest request including a digital photo of the object of interest may be generated by a warning system and transmitted to an array of cameras equipped with a corresponding recognition module. The endpoint agent cameras are equipped with a recognition module which searches camera captures and processed images, as well as prior recorded and stored images in local data storage to determine if there are potential matches based upon the pattern recognition algorithms employed by the recognition module.

The distributed intelligent pattern recognition system may include multiple agents/agencies, each of which may include one or more camera client devices. The agents and agencies may have roles such as a master pattern matching agent, a secondary pattern matching agent, or an edge pattern matching agent where the master pattern matching agent may have a larger recognition module and a larger (or access to more) reference data compared to a secondary pattern matching agent. The secondary pattern matching agent may have a larger recognition module and a larger (or access to more) reference data than an edge pattern matching agent. An edge pattern matching agent may be a camera client device that has a limited recognition module. For example, a camera client device may have one or more object of interest modules active at a time, where an object of interest module may include but is not limited to a facial recognition module, a vehicle recognition module, license plate reading module, or an animal recognition module. Further, one or more edge pattern matching agents may be associated with a master pattern matching agent or a secondary pattern matching agent that may provide one or more object of interest modules to each associated edge pattern matching agent. In an embodiment, a master pattern matching agent may provide an object of interest pattern recognition service.

When a camera captures and processes an image that generates a potential match image, the camera may transmit an electronic message to the agency originating the alert request with the time and date of the potential match image, the location of the camera, and one or more images or video snippets from which the pattern was detected. The originating agency may utilize a machine pattern match or a human agent to confirm that the potential match image is of interest and send a communication to the local law enforcement agency serving the location in which the detecting camera is located. Also, prior to the transmission of the electronic message, at substantially the same time as the transmission, or after the transmission, the potential match image upon which an identification is made may be sent to one or more computer processors, either working alone or in concert, that perform additional pattern recognition analysis using one or more complementary or different algorithms, to determine the relative probability or confidence of match. These secondary pattern matching agents may make calls to or retrieve from a database or data store, other reference images, image abstractions or models to calculate a probability of match. Using confirming inputs regarding the accuracy of the machine pattern match, local camera pattern matching module algorithms can be updated for detection accuracy along with the secondary or master pattern matching agents, much like a neural network. As can be inferred, the embodiments provide a means for watching for an object of interest over a wide area of disjunctive cameras and cameras systems in time and space with an associated communications messaging system to enable agents of interest to take action. The embodiments have many applied uses, including but not limited to identification and tracking for border control, patient safety, visitor or guest identification, student and campus personnel, ATMs security, merchant community security and crime investigation, and incident reconstruction.

FIG. 1 illustrates a system 100 according to an embodiment. System 100 includes a cloud service agent 110, agency A control domain 130, and agency B control domain 140, which are coupled via internet/data network 120. Cloud service agent 110 provides cloud application database services and may include display 119, application server 114, and application database 112. Application server 114 may be implemented on one or more different computing devices in hardware, software, or any combination thereof. Such computing devices may include, but are not limited to a personal computer, a mobile phone, a tablet, a PDA, a workstation, an embedded system, a game console, a television, a set top box, or any other computing device. Application database 112 may be any type of structured data store, including a relational database. Display 119 may include but is not limited to a monitor or a touch screen for example. While not shown, the elements of cloud service agent 110 may be coupled via a local, wide area, or distributed network, for example.

An agency may be a secure community that includes a collection of communications and/or media resources maintained by an administrator as defined in the Enclaved Application. Agency A 130 and agency B 140 may include substantially similar elements. For convenience, elements of agency B 140 are described, but these descriptions are generally applicable to agency A 130. Agency B 140 may include application database 142, application server 144, and display 149 which may be substantially the same as application database 112, application server 114, display 119 as described above, and coupled together via local, wide area, or distributed network 147. Agency B 140 may be coupled to internet/data network 120 via router 141. Agency B 140 may also include gateway 146 which may be an interoperability gateway device as described in the Enclaved Application. Agency B 140 may include network interface controller (NIC) 160 which may be a radio network interface controller (RNIC) as described in the '445 and '874 patents. NIC 160 may be coupled to a radio network 170 that may include antennas and base consoles that utilize one or more communications channels including but not limited to Very High Frequency (VHF) and Ultra High Frequency (UHF) channels. Each of radio communications devices 175a and 175b may be a hand held or portable communication device that communicates with radio network 170. Mobile computing device 180 may include but is not limited to broadband data capable devices (e.g., a smart phone, a tablet, a personal digital assistant (PDA), or a laptop computer) that may be capable of voice (e.g., voice over IP (VoIP), cellular communications, or push to talk as described in the Dynamic Talk Group Application), data, and video communications, for example. Camera client devices 148a and 148b are devices capable of capturing images and/or processing the captured images to detect and recognize an object of interest. Camera client device 148a is coupled to local, wide area or distributed network 147 directly or via private/public data connection 155 as shown for camera client device 148b.

Figure 2A:
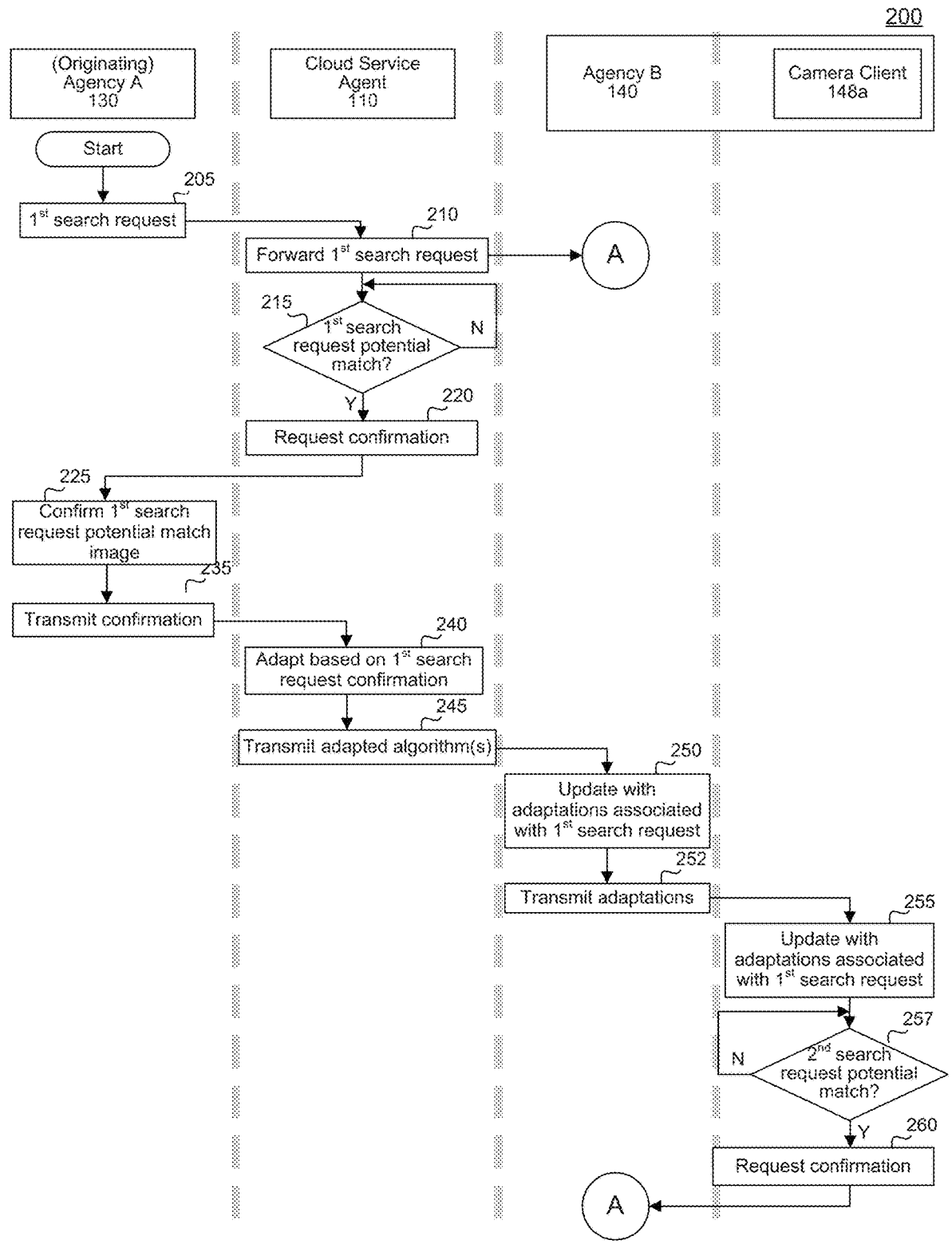
FIG. 2A illustrates a method for distributed intelligent pattern recognition according to an embodiment.
Figure 2B:
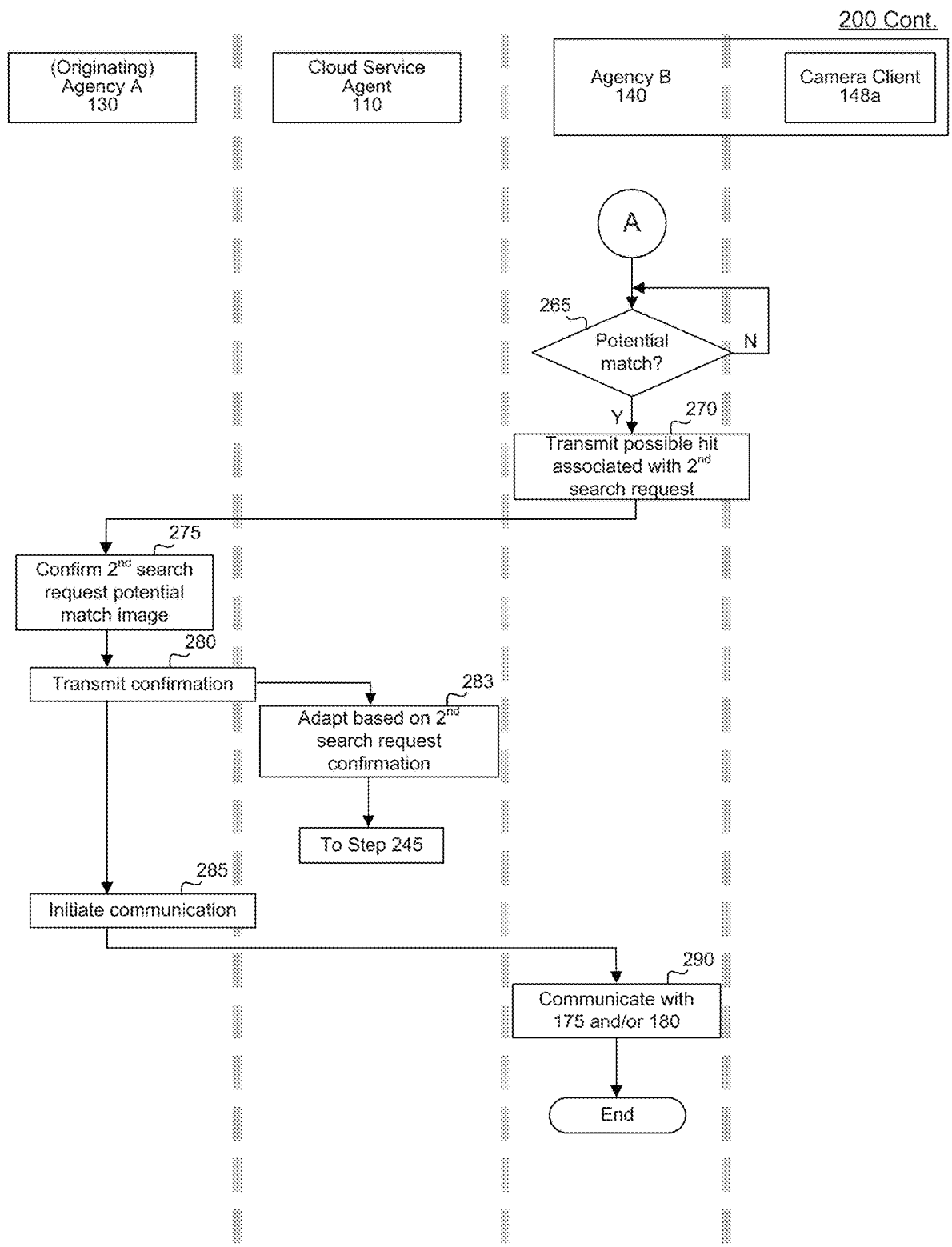
FIG. 2B illustrates a method for distributed intelligent pattern recognition according to an embodiment.

FIGS. 2A and 2B illustrate a method 200 for distributed intelligent pattern recognition according to an embodiment. For ease of discussion and without limitation, method 200 is described with reference to elements of system 100 of FIG. 1 with the example of the lost/stolen child as the object of interest. In the example, agency A 130 is an originating secondary pattern matching agency, cloud service agent 110 is a master pattern matching agent, and agency B 140 is a secondary pattern matching agency. Thus, cloud service agent 110 may transmit requests from the originating secondary pattern matching agency A 130 to secondary pattern matching agency B 140, and receive confirmation requests from secondary pattern matching agency B 140, and transmit the confirmation requests to originating secondary pattern matching agency A 130. In the example, originating agency A 130 initiates two search requests: a first search request at step 205, and a second search request (not shown) but discussed at step 257.

Method 200 begins and at step 205, originating agency A 130 transmits a first search request to cloud service agent 110 to find a lost/stolen child (e.g., the sought object of interest) that may include a message as well as a digital image of the lost/stolen child. Method 200 proceeds to step 210.

At step 210, cloud service agent 110 may receive the first search request and forward the first search request to N recipients to assist with the search for the lost/stolen child. In an example, cloud service agent 110 may initiate a first search request on behalf of a non-agency entity such as a subscriber to a search service (not shown). A recipient includes one or more agencies and/or one or more camera client devices 148, and cloud service agent 110 transmits the first search request to agency B 140 (at label A). Method 200 proceeds to step 215.

At step 215, cloud service agent 110 processes the first search request to find a lost/stolen child. Cloud service agent 110 compares the image of the lost/stolen child with image files to determine a potential match image by utilizing application server 114, application database 112, or another database or service (not shown) with which cloud service agent 110 has access. In the example, two potential match images M1 and M2 are determined and method 200 proceeds to step 220. If no potential matches are determined, method 200 remains at step 215 to determine other potential matches, as required. In an embodiment, cloud service agent 110 may transmit a no-match message to originating agency A 130. Method 200 proceeds to step 220.

At step 220, cloud service agent 110 transmits a request for confirmation message associated with the first search request including the potential match images M1 and M2 with corresponding data to originating agency A 130. The corresponding data (e.g., obtained from a reference data module), may include but is not limited to a time and date that the image (e.g., M1 or M2) was captured, and a location of the camera that captured M1 or M2. Method 200 proceeds to step 225.

At step 225, originating agency A 130 receives the request for confirmation message including the potential match images M1 and M2 in response to the first search request, and determines whether one or both are indeed, images of the lost/stolen child (e.g., the sought object of interest). In the example, M2 is positively confirmed while M1 is not. Using the corresponding data of the potential match images that are positively confirmed, the location of an object of interest can be tracked over time and space on a visual map (e.g., on a graphical user interface on display device 139 of agency A.) When a potential match image (e.g., M2) is positively confirmed, originating agency A 130 may transmit a communication message to a local law enforcement agency associated with the location of the camera client that captured M2, informing them that that the lost/stolen child associated with the first search request has been detected in their jurisdiction. Method 200 proceeds to step 235.

At step 235, originating agency A 130 transmits a confirmation message associated with the first search request to cloud service agent 110, the master pattern matching agent, to forward to the secondary pattern matching agents and/or edge pattern matching agents (e.g., camera clients). The confirmation message may indicate a positive confirmation for M2 and a negative confirmation for M1 that were received as well as corresponding data. Method 200 proceeds to step 240.

At step 240, cloud service agent 110 receives the confirmation message associated with the first search request, feedback from originating agency A 130, and adapts corresponding algorithms and reference data accordingly. Thus, the positively and negatively confirmed images are used to refine and adjust one or more algorithms and reference data associated with their identification as potential match images. The updates may include making additional associations of M2 and the object of interest image and disassociating M1 with the object of interest image, for example. Method 200 proceeds to step 245.

At step 245, cloud service agent 110 may transmit the adapted algorithm(s), adapted reference data, and/or M2 (e.g., the positively confirmed image) associated with the first search request to secondary pattern agencies that use that algorithm to enable them to update their respective algorithms and reference data accordingly. In an embodiment, adjustments to algorithms and reference data due to M1 (a negatively confirmed image) as well as M1 may also be transmitted to enable secondary pattern agencies (e.g., agency B 140) to update and/or adapt accordingly. In an embodiment, cloud service agent 110 may forward the updated algorithms, updated reference data, M2, and/or M1 directly to camera client device 148a (not shown), and camera client device 148a may subsequently inform agency B 140 of the updates. Method 200 proceeds to step 250.

At step 250, agency B 140 receives the update message associated with the first search request including M2 and/or M1, and adapts and/or incorporates the adaptations of the algorithms and reference data accordingly. Note that the update message is an example of feed forward learning as agency B 140 did not identify the potential match associated with M1 or M2. Method 200 proceeds to step 252.

At step 252, agency B 140 transmits the adaptations associated with the first search request to camera client devices 148a, 148b that use the algorithms that are updated. For example, camera client device 148a's object of interest module may include a facial recognition module and will receive the adaptations, while camera client device 148b may include an object of interest module that is currently a vehicle recognition module. Thus, camera client device 148b would not receive the adaptations. Note that camera client devices 148a, 148b may request or be directed, manually or via a program, by their home agency to change their object of interest module based on priorities. Method 200 proceeds to step 255.

At step 255, camera client device 148a receives the one or more algorithm updates and/or one or more reference data updates associated with the first search request from agency B 140 and adjusts algorithms and reference data accordingly. Note that the algorithm and reference data updates are examples of feed forward learning as camera client device 148a did not identify the potential match associated with M1 or M2. In another embodiment (not shown), camera client device 148a may receive the confirmation message from cloud service agent 110 or originating agency A 130, and adjust algorithms and reference data accordingly. Method 200 proceeds to step 257.

At step 257, camera client device 148a may use the updated algorithms and reference data to process a second search request received (not shown) to determine a potential match image with any object of interest images. When a potential match image M5 is determined, method 200 proceeds to step 260. If no potential matches are determined, method 200 remains at step 257 to determine other potential matches, as required. Method 200 proceeds to step 260.

At step 260, camera client device 148a may transmit a confirmation request message associated with the second search request to agency B 140, cloud service agent 110, or originating agency A 130. In this example, camera client device 148a transmits a confirmation request message to agency B 140 with a potential match image, M5, with corresponding data to agency B 140, and method 200 proceeds to step 265 (as label A).

At step 265, agency B 140 compares potential match images based on two search requests, the first search request from step 210, and the second search request from step 260. For example, agency B 140 receives and compares potential match image M5 with the image of the lost/stolen child of the second search request to confirm that M5 may be a possible match with the object of interest image. If a potential match image is not confirmed, method 200 remains at step 265 to confirm other potential matches. If a potential match image (e.g., M5) is confirmed, method 200 proceeds to step 270.

Also at step 265, agency B 140 may receive the first search request to find a lost/stolen child (e.g., from step 210). Agency B 140 compares the image of the lost/stolen child with image files to determine a potential match image by utilizing application server 144, application database 142, or another database or service (not shown) with which agency B 140 has access. In an example, no potential matches are determined for the first search request, and method 200 remains at step 265 awaiting another search request to determine other potential matches. Method 200 proceeds to step 270.

At step 270, agency B 140 determines the originating agency that generated the second search request (of step 257) and transmits a possible hit (e.g., positive confirmation on a potential match image) message (e.g., to originating agency A 130) that includes M5 with corresponding data. Method 200 proceeds to step 275.

Also at step 270, agency B 140 may transmit a no-match message (not shown) to originating agency A 130 or cloud service agent 110 when no potential match image is determined for the first search request.

At step 275, originating agency A 130 receives the possible hit message associated with the second search request and determines whether the confirmed potential match image is a match (e.g., satisfies criteria such as thresholds). The determination may be made by a human or a machine device. Method 200 proceeds to step 280.

At step 280, originating agency A transmits a confirmation message associated with the second search request to cloud service agent 110 to forward to the agency(ies) and/or camera client(s) from which the one or more potential match images were received. The confirmation message may indicate a positive or negative confirmation for M5. In this example, originating agency A 130 transmits a positive confirmation for M5 to cloud service agent 110. Method 200 proceeds to step 283.

At step 283, cloud service agent 110 adapts reference data and algorithms associating M5 with the object of interest image and additional confirmation analysis associated with the second search request may be performed. The adaptation based on the positive confirmation of M5 is an example of feed forward learning since cloud service agent 110 did not identify M5 as a potential match image. Method 200 proceeds back to step 245 to disseminate the updates to secondary pattern agencies accordingly. When the update is propagated to camera client device 148a, the update will be an example of feedback learning and adapting since camera client device 148a originally identified M5 as a potential match image.

At step 285, operating agency A 130 may initiate a voice, video, or text based communication associated with the second search request with agency B 140 or an agent of agency B 140. In an embodiment, operating agency A 130 may establish an interoperability communications session with an agent of agency B 140 as described in the '445 and '874 patents as well as the Enclaved Application when originating agency A 130 and/or agency B 140 are secure communities. In an embodiment, when a potential match image is confirmed (e.g., an object recognition hit), the originating agency may create an interoperability communications session with the agency that provided the potential match image (e.g., the agency associated with the location of the object of interest or the detecting client camera). Method 200 proceeds to step 290.

At step 290, agency B 140 may send a communications message associated with the second search request to communications resources 175 and/or mobile computing device 180 indicating an object of interest hit, where communications resources 175 and/or mobile computing device 180 are in proximity to the camera client that captured and/or determined the potential match image, M5.

In addition, agency B 140 may update the algorithm according to the second object of interest hit. For example, Agency B 140 may transmit the updated algorithm to camera client device 148a that utilizes the algorithm. Method 200 ends.

Figure 3:
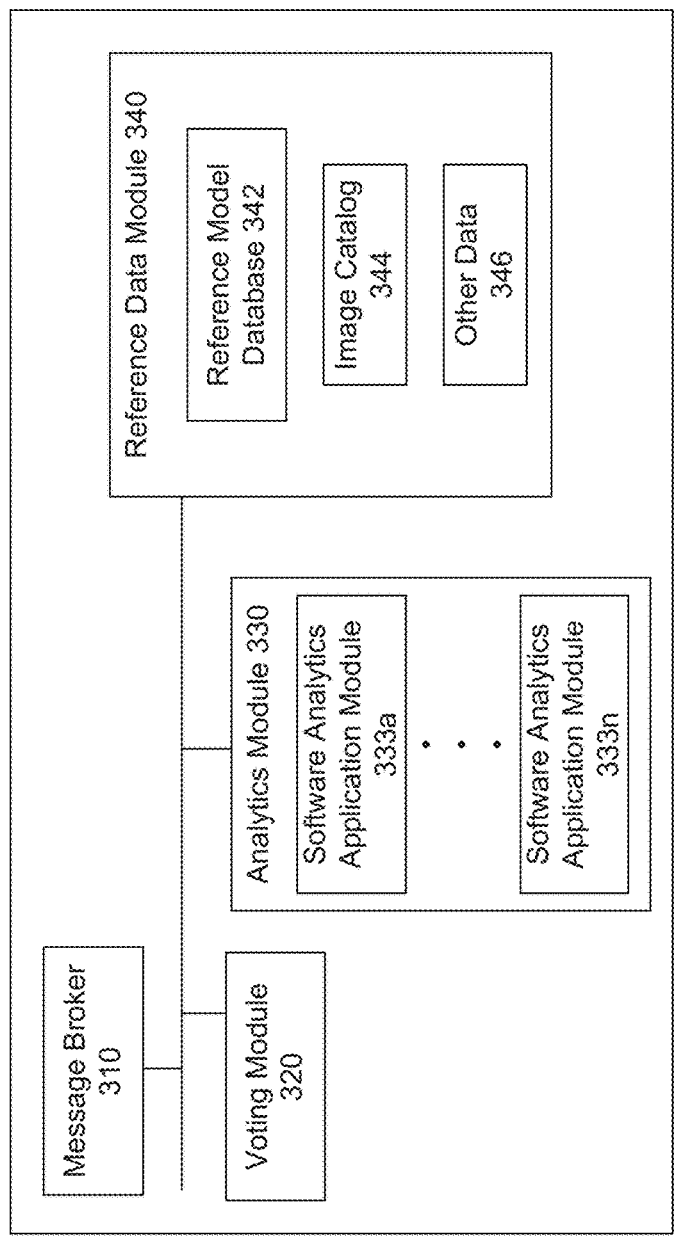
FIG. 3 illustrates a block diagram for a pattern recognition device according to an embodiment.

FIG. 3 illustrates a block diagram 300 for a pattern recognition device according to an embodiment. For ease of discussion and without limitation, block diagram 300 is described with reference to elements of FIGS. 1 and 2. Block diagram 300 may be an interactive visual identification exchange widget (IVIEW). An IVIEW may be collocated in one or more client computing devices (e.g., camera client device 148 and/or a body worn camera device as described in the Biosensor Trigger Application), application server and/or application database (e.g., 114/112, 134/132, 144/142), cloud service agent (110), or combinations thereof. Further, portions and functions of an IVIEW may be located in a client computing device such as camera client device 148a. IVIEW components are logically coupled and connected by means of a communications path wherein messages and data may be exchanged.

Block diagram 300 may include message broker 310, voting module 320, analytics module 330, and reference data module 340. Message broker 310 may be a computing application that receives, transmits, and responds to communications messages to and from message brokers in other IVIEWs. Analytics module 330 may include one or more software analytics application modules 333a-333n. A software analytics application module 333 may be a computer application or module that performs pattern or object identification utilizing one or more algorithms. For example, software analytics application module 333 may include but is not limited to a facial recognition module, a vehicle recognition module, an animal recognition module, a license plate recognition module, an object of interest module, or other module with pattern recognition algorithms. Analytics module 330 analyzes an image or series of image inputs to identify objects of interest, or characterize identified objects or patterns as being members of a class, type of object, or a category of items.

Embodiments enable pattern and relational identification. For example, analytics module 330 may query one or more databases containing images in reference data module 340 and/or may be logically coupled to data mining applications or services to correlate potential match image(s) with associated metadata. Further, embodiments enable displaying the location of the camera client location and time on a visual map, where the camera client is associated with the potential match image(s).

Analytics module 330 may also identify related objects of interest. Related objects of interest may be other objects in relation to or in association with the object of interest. Related objects of interest may be identified by means of search request to other agencies as in the case of an object of interest. By way of example, a lost child is the object of interest. An image matching the child may be captured by a camera client of an agency. The image also contains the face of another person in proximity to the lost/stolen child. This second person is a related object of interest. The second person may be subject to identification request that is sent to other recipient agencies. A search for images matching the related object of interest may be performed using a social media mining application, web pages or other readable media formats containing an image with associated data such as names and addresses that may be identified and associated with related object of interest. Thus, analytics module 330 may also be logically coupled to search or data mining applications or services whereby images matching or similar to related objects of interest may be identified, and meta data associated with a matching or similar image on a social media or other public or accessible data or information network may be captured and associated with the related objects of interest and object of interest. Related objects of interest may be based on other types of pattern recognition including vehicles, animals, artifacts, and so on.

Analytics module 330 may also include statistical analytics modules and associated data visualization applications whereby relational frequency and rates are used to determine probability of location and/or association with other related objects of interest. For example, when a missing child is captured in several matched image hits (e.g., positive confirmation on a potential match image) and the same person is detected in an image hit or in a series of images, statistical analytic modules and/or data visualization applications may identify this person as a related object of interest.

Embodiments may include predictive reference models for aging, disguises, or changes in appearance. For example, analytics module 330 and reference data module 340 include software analytics application modules and data that enable an object of interest to be represented in an image or series of images aged in relation to the current time. Thus, the object of interest may be transformed by algorithms and reference data to predict how the object will have aged or has aged over time. The time transformed object of interest may be transmitted or otherwise made accessible to other agencies for purposes of referential identification. Further, until an object of interest search request is satisfied, the aging algorithm may be periodically run against the object of interest images or set of images and may be transmitted as an update to recipient searching agencies.

Embodiments may include predictive reference modules as part of analytics module 330 and reference data module 340 where the object of interest may be transformed using algorithms that predict how the object of interest may appear with changes to properties or features associated with the object of interest such as, in the case of a specific human object of interest, changes in hair color, hair style, facial hair, apparent, eye color, removal or additions of body markings, and clothes.

Voting module 320 may be a computer application or module that assesses the quality of matches between potential match images generated by one or more software analytics application modules 333a-333n of analytics module 330, and an object of interest. Reference data module 340 may include reference model database 342, image catalog 344, and/or other data 346. Reference model database 342 may include any type of structured data store, including a relational database. Image catalog 344 may be any data storage element. Reference model database 342 and image catalog 344 may include but are not limited to reference image files, image dictionaries, abstract image modules, component or elemental shapes or combinations thereof, metadata or properties associated with an image file or files, or class of image files or objects. Other data 346 may include, but is not limited to: an originating agency, a date and time of an image, a camera client ID, a camera client location, an agency communications address and/or routing information, a relational ID, a confirmation and request transaction ID, a stored or preformatted formatted message, a message request expiration value, a name, hair, skin, and/or eye color, ethnicity, gender, height, material, related objects, persons related to the object of interest, an identifying number, legal status, or other properties of an object of interest.

Figure 4:
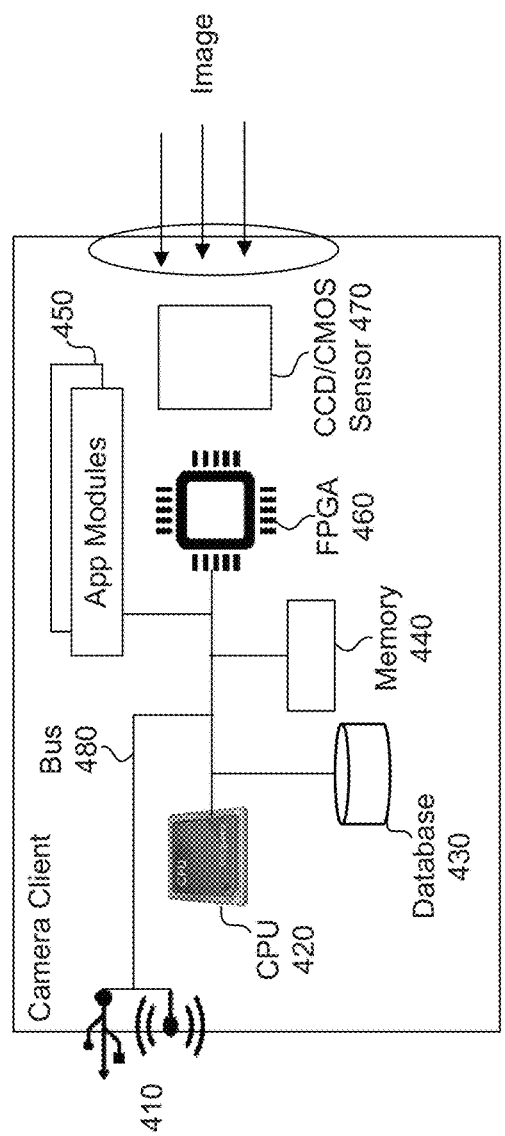
FIG. 4 illustrates a block diagram for a camera client device according to an embodiment.

FIG. 4 illustrates a block diagram for a camera client device 400 according to an embodiment. For ease of discussion and without limitation, camera client device 400 is described with reference to elements of FIGS. 1-3. Device 400 may be a camera client device 148, for example. Device 400 may include an interface such as a universal standard bus (USB) interface or a wireless interface such as a Wi-Fi interface, coupled to bus 480. Device 400 may include a central processing unit (CPU) 420, database 430, memory 440, application modules 450, field programmable gate array (FPGA) 460, and charge-coupled devices (CCD)/ complementary metal-oxide-semiconductor (CMOS) sensor 470 which may be coupled to bus 480. Device 400 may perform the functions of an IVIEW of FIG. 3. In some embodiments, device 400 may include portions of functions of an IVIEW.

Embodiments provide task based adaptive pattern recognition with context switching. Computation for some edge computing devices such as wearable cameras (e.g., as described in the Biosensor Trigger Application) or mobile devices may have limited computing power, memory and power. Generalized pattern recognition modules may require intensive processing, memory utilization and power consumption. Embodiments enable an IVIEW to request and/or receive an object of interest module that includes a pattern recognition algorithm that is object type or object specific. Thus, the IVIEW may receive an optimized algorithm directed to a particular task assigned, or to a particular task that the IVIEW may infer from a search request received. For example, when a search request is received by the IVIEW seeking facial identification, the IVIEW may request a facial recognition algorithm from a service or source (e.g., cloud service agent 110, originating agency A 130, or agency B 140.) When the IVIEW receives the facial recognition algorithm, the existing algorithm being used (e.g., a vehicle recognition algorithm) may be substituted and replaced such that the camera recognition mode is focused on facial recognition. As an example, FPGA 460 may be programmed to execute the received facial recognition algorithm.

Embodiments may include a notification and priority system or module which may be human or agent based where priorities in pattern recognition tasks may be established. Based on a priority message (e.g., received in a search request), an IVIEW may select one algorithm versus another based on criteria, such as suitability of the algorithm for the type of object sought to be recognized, the camera resolution, speed, or other attributes. In an example, a camera client may receive a search request to look for specialized patterns for a certain time periods, e.g., search for a blue van for the next hour and then look for a given person of interest for the subsequent 3 hours. Thus, FPGA 460 may be programmed to support a vehicle recognition algorithm and subsequently be programmed to support a facial recognition algorithm.

Embodiments may include a context/concept recognition system or module that enables an IVIEW to determine the object concept or membership type of interest based on the content of a message received. For example, when an IVIEW receives a search request from an agent that states "look for a black dog", the concept engine recognizes the concept "dog" as an object classification type with an associated attribute of black. Based on the concept interpretation, an IVIEW may request a pattern recognition algorithm optimized for dogs and fur color.

Figure 5:
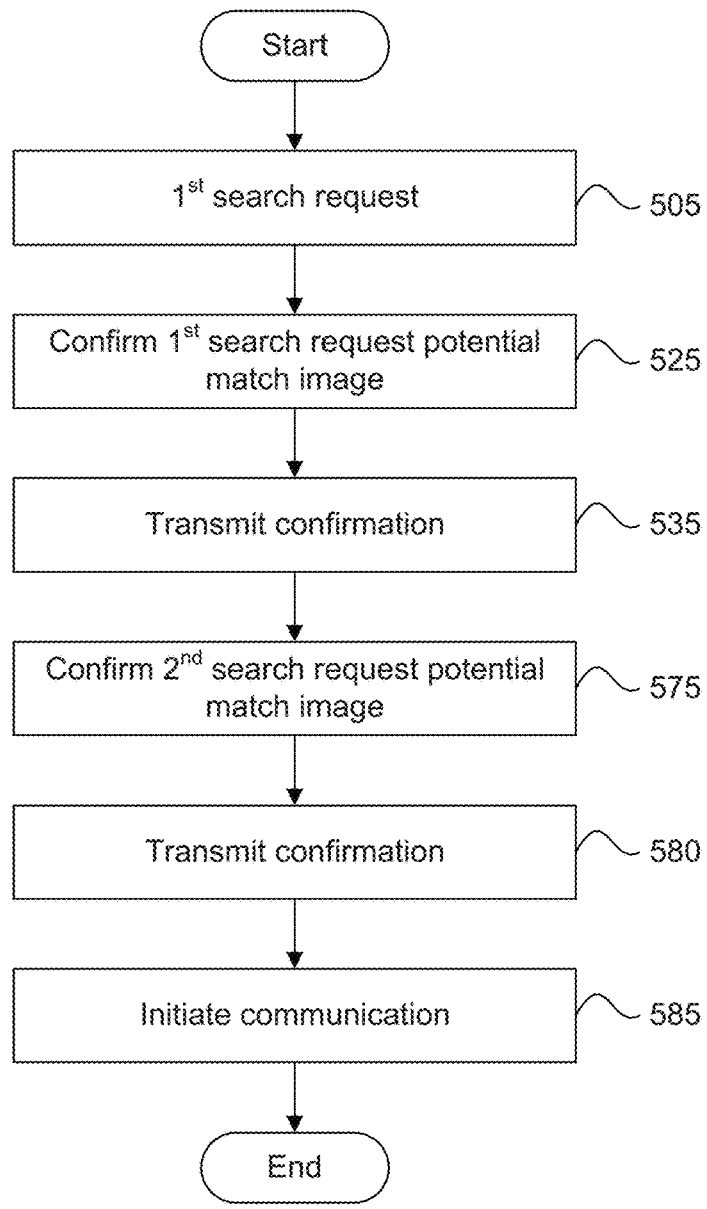
FIG. 5 illustrates a method for a pattern recognition device in an originating agency according to an embodiment.

FIG. 5 illustrates a method 500 for a pattern recognition device in an originating agency according to an embodiment. For ease of discussion and without limitation, method 500 is described with reference to method 200 of FIGS. 2A and 2B. For example, steps in FIGS. 2A and 2B associated with originating agency A 130 (e.g., 205, 225, 235, 275, 280, and 285) correspond to the steps in FIG. 5 (e.g., 505, 525, 535, 575, 580, and 585). Steps in FIG. 5 are further described with reference to elements of FIGS. 1, 3, and 4 with the example of the lost/stolen child as the object of interest.

Method 500 begins and at step 505, message broker 310 of agency A 130 transmits a first search request for a lost/stolen child. In an embodiment, message broker 310 of agency A 130 transmits the search request to cloud service agent 110.

The first search request may include a message and an image file of the object of interest (e.g., a digital image of the lost/stolen child). The message may include but is not limited to: an originating agency, a date and time of an image of the object of interest, last known location of the object of interest, originating agency communications address and/or routing information, a relational ID, a confirmation and request transaction ID, a stored or preformatted formatted message, a message request expiration value, a name, color (e.g., hair, skin, and/or eyes), ethnicity, gender, height, material (e.g., clothing), related objects, persons related to the object of interest, an identifying number, an identifying feature (e.g., mole, birthmark, scars, description, legal status, or other properties of an object of interest. Method 500 proceeds to step 525.

At step 525 message broker 310 of agency A 130 receives a request for confirmation message associated with the first search request that includes one or more potential match images and/or one or more no-match images. In this example, potential match images include M1 and M2 as files, with a request for a confirmation of a match. A determination is made whether M1 and/or M2 satisfy the threshold criteria to make a positive confirmation of the object of interest. In some embodiments the determination is manual (e.g., a human makes the decision), and in some embodiments the determination is made by an IVIEW device of agency A 130. For example, the potential match images M1 and M2 may be analyzed by analytics module 330 of agency A 130 against images of the object of interest (e.g., images of the lost/stolen child) in reference data module 340 of agency A 130. Subsequent to the analysis, voting module 320 applies heuristics or other criteria to positively confirm that M2 satisfies threshold criteria for a match with the lost/stolen child, while M1 is not positively confirmed. Originating agency A 130 may update analytics module 330 and reference data module 340 of agency A 130 based on the determination of positively confirmed potential match images (e.g., M2) as well as negatively confirmed potential match images (e.g., M1) as well as any associated other data (e.g., date, time, metadata associated with M1 and M2). Method 500 proceeds to step 535.

At step 535, message broker 310 of originating agency A 130 transmits a confirmation message associated with the first search request to message broker 310 of the IVIEW device that identified the potential match image(s), or to message broker 310 of cloud service agent 110 for dissemination to the secondary pattern recognition agencies. The confirmation message may indicate a positive confirmation for M2 and a negative confirmation for M1 that were received. In this example, message broker 310 of originating agency A 130 transmits a confirmation message to message broker 310 of cloud service agent 110 from which M1 and M2 were received. Method 500 proceeds to step 575.

At step 575, message broker 310 of originating agency A 130 receives a possible hit message associated with a second search request and determines whether the confirmed potential match image is a match. A hit is a positive confirmation on a potential match image. The determination may be made by a human or a machine device. In an embodiment the determination is made by an IVIEW device of agency A 130. For example, the possible hit image M5 may be analyzed by analytics module 330 of agency A 130 against images of the object of interest (e.g., images of the lost/stolen child) in reference data module 340 of agency A 130. Subsequent to the analysis, voting module 320 of agency A 130 applies heuristics or other criteria to positively confirm that M5 satisfies a second threshold criteria for a match with the lost/stolen child. Method 500 proceeds to step 580.

At step 580, message broker 310 of originating agency A 130 transmits a confirmation message associated with the second search request to message broker 310 of cloud service agent 110. Recall that cloud service agent 110 is a master pattern match agent in the example. Thus, cloud service agent 110 transmits the confirmation message to secondary pattern matching agency(ies) (e.g., agency B 140) and/or edge pattern matching agent (e.g., camera client device(s) 148) in the system to provide feed forward or feed backward data for adaptations. The confirmation message may indicate a positive or negative match confirmation for M5. In this example, message broker 310 of originating agency A 130 transmits a positive match confirmation message including M5 to message broker 310 of cloud service agent 110. Method 500 proceeds to step 585.

At step 585 message broker 310 of operating agency A 130 may initiate a voice, video, or text based communication with an agent of agency B 140 associated with the second search request regarding the confirmation match between M5 and the lost/stolen child image. In an embodiment, operating agency A 130 may establish a session with an agent of agency B 140 as described in the '445 and '874 patents and in the Enclaved Application when originating agency A 130 and/or agency B 140 are secure communities. Method 500 ends.

Figure 6:
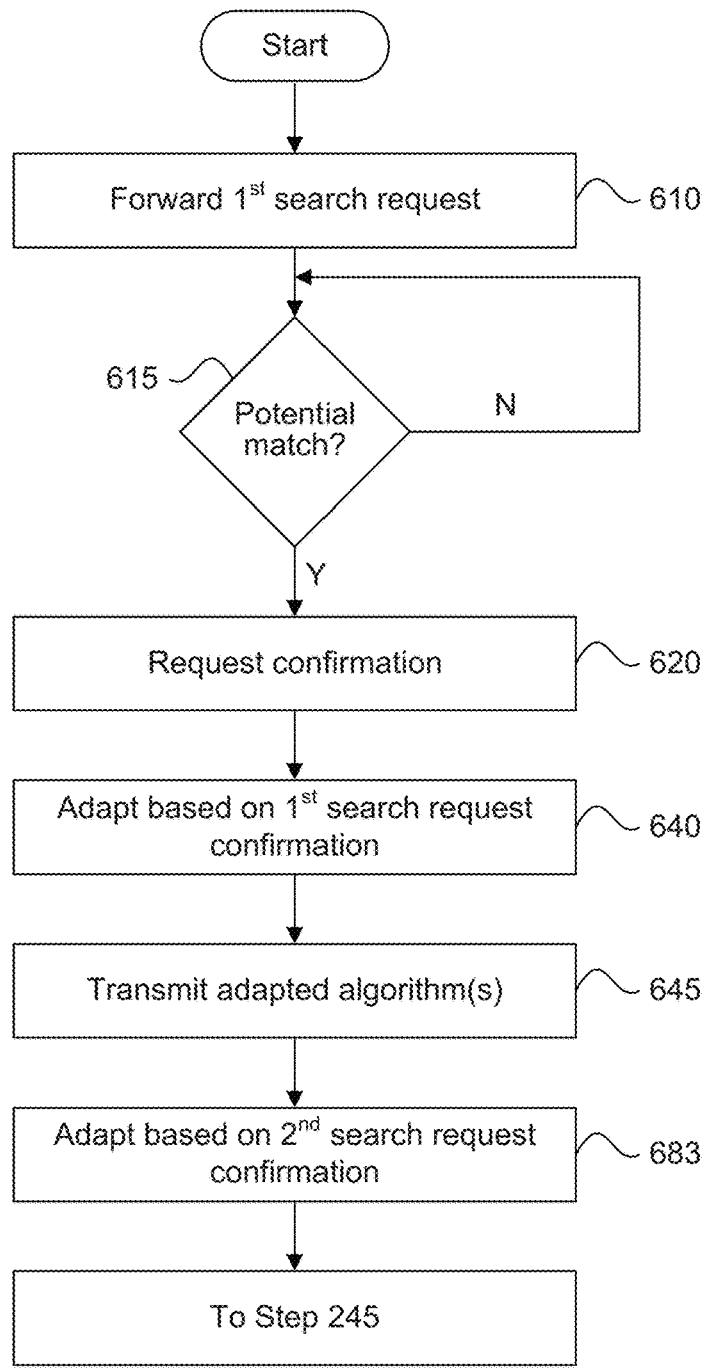
FIG. 6 illustrates a method for a pattern recognition device in a cloud service agent.

FIG. 6 illustrates a method 600 for a pattern recognition device in a cloud service agent according to an embodiment. For ease of discussion and without limitation, method 600 is described with reference to method 200 of FIGS. 2A and 2B. For example, steps in FIGS. 2A and 2B associated with cloud service agent 110 (e.g., 210, 215, 220, 240, 245, and 283) correspond to the steps in FIG. 6 (e.g., 610, 615, 620, 640, 645, and 683). Steps in FIG. 6 are further described with reference to elements of FIGS. 1, 3, and 4 with the example of the lost/stolen child as the object of interest.

Method 600 begins and at step 610, where message broker 310 of cloud service agent 110 receives a first search request from another message broker (e.g., originating agency A 130) to find a lost/stolen child (e.g., the object of interest). The first search request may include a message and an image file of the object of interest (e.g., a digital image of the lost/stolen child). The message may include but is not limited to: an originating agency, a date and time of an image of the object of interest, last known location of the object of interest, originating agency communications address and/or routing information, a relational ID, a confirmation and request transaction ID, a stored or preformatted formatted message, a message request expiration value, a name, color (e.g., hair, skin, and/or eyes), ethnicity, gender, height, material (e.g., clothing), related objects, persons related to the object of interest, an identifying number, an identifying feature (e.g., mole, birthmark, scars, description, legal status, or other properties of an object of interest.

Message broker 310 of cloud service agent 110 may forward the first search request to message broker 310 of N recipients, where a recipient may be an agency (e.g., agency B 140) or a camera client device (e.g., camera client device 148*a*). In an example, a camera client device that is not associated with an agency may receive the first search request (e.g., a private enterprise may allow a camera client device on premises to be part of a search service offered by cloud service agent 110). Method 600 proceeds to step 615.

At step 615, analytics module 330 of cloud service agent 110 may use one or more software analytics application modules 333 to analyze the image file of the object of interest of the first search request against reference data module 340 (e.g., model database 342, image catalog 344, and/or other data 346*a* and 346*b*) of cloud service agent 110 to determine a candidate image that is a close match to the object of interest image file. If the candidate image is a person, face recognition analysis may include for example, weighing the properties of eye separation, chin-to-nose ratios, permutations, and variations using algorithms to determine whether an image is a candidate image. In an embodiment, other relational information may be accessed including related objects of interest, data mining, beacons, and inference based data (described below).

In the example, four different candidate images M1-M4 may be identified associated with the first search request. Candidate images M1-M4 may be sent to voting module 320 of cloud service agent 110. Based on heuristic or other criteria, voting module 320 may determine that a potential match image is a candidate image that satisfies a threshold criteria. In this example, M1 and M2 are determined to be potential match images. Images M3 and M4 did not satisfy the threshold criteria and are not potential match images. Accordingly, reference data module 340 is updated with the potential match images. For example, the object of interest image is associated with other images of the potential match images M1 and M2 while candidate images M3 and M4 that did not satisfy threshold criteria may be disassociated with the object of interest image file. Further, the object of interest image file is assigned a new image ID, the object of interest image may be stored in image catalog 344, and new reference model(s) are generated accordingly. Method 600 proceeds to step 620.

At step 620, message broker 310 of cloud service agent 110 may call match images M1 and M2 with the highest probabilities that satisfied the threshold criteria from reference data module 340 (e.g., reference model database 342) and transmit M1 and M2 in a confirmation request message to the originating agency that issued the first search request, originating agency A 130. In an embodiment, message broker 310 of cloud service agent 110 may transmit a no-match message to originating agency A 130 including M3 and M4. Method 600 proceeds to step 640.

At step 640, message broker 310 of cloud service agent 110 receives a confirmation message associated with the first search request and transmits the confirmation message to relevant software analytics application modules 333 and/or reference data module 340. Algorithms and reference data may be adapted and refined based on the feedback in the confirmation message since cloud service agent 110 identified M1 and M2 as potential match images. For example, M1 was not positively confirmed, thus the object of interest image is disassociated with images associated with M1. As M2 was positively confirmed, the object of interest image may be confirmed with images of M2. In addition, updated values of reference data module 340 may be exchanged with analytics module 330 to refine algorithms or train neural networks. Method 600 proceeds to step 645.

At step 645, an adapted algorithm associated with the first search request is transmitted from analytics module 330 to message broker 310 of cloud service agent 110 for publication to agencies to update applicable camera clients that use the algorithm. Method 600 proceeds to step 683.

At step 683, message broker 310 of cloud service agent 110 receives a message associated with the second search request to adapt reference data and algorithms associating M5 with the object of interest image and additional confirmation analysis may be performed. This is an example of feed forward learning and adapting as cloud service agent 110 did not identify M5 as a potential match image. Method 600 proceeds back to step 645 to disseminate the updates to secondary pattern agencies accordingly. Method 600 ends.

Figure 7:
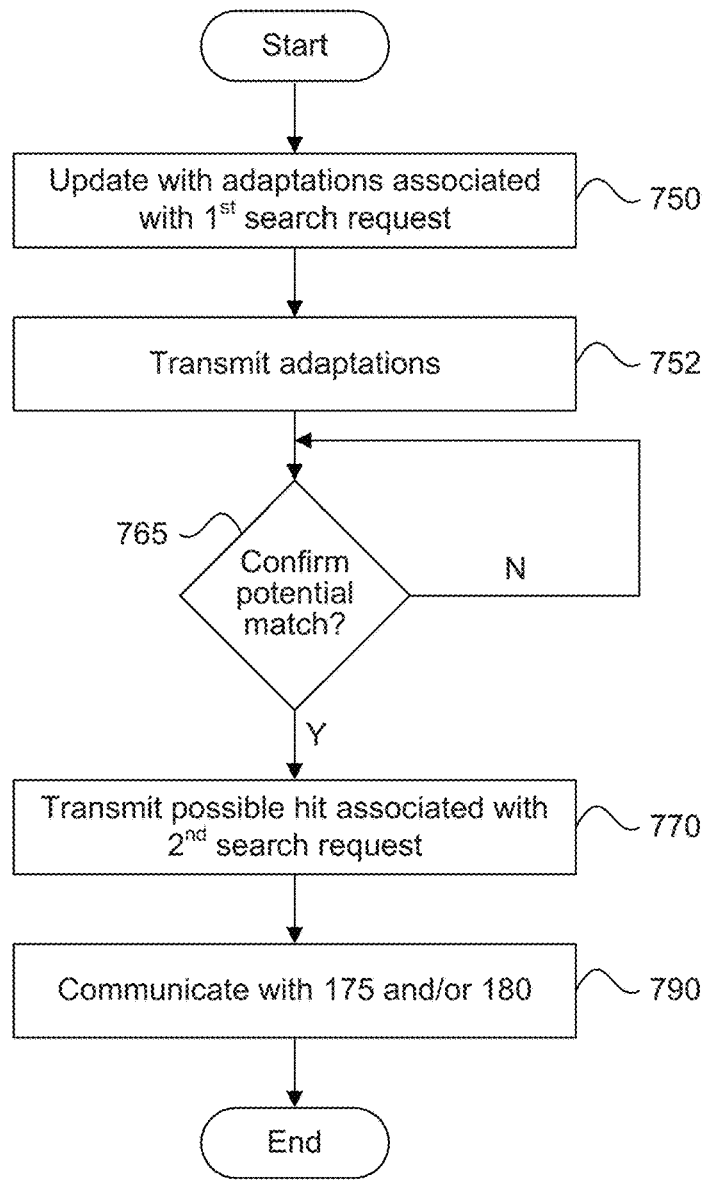
FIG. 7 illustrates a method for a pattern recognition device in an agency according to an embodiment.

FIG. 7 illustrates a method for a pattern recognition device in an agency according to an embodiment. For ease of discussion and without limitation, method 700 is described with reference to method 200 of FIGS. 2A and 2B. For example, steps in FIGS. 2A and 2B associated with agency B 140 (e.g., 250, 252, 265, 270, and 290) correspond to the steps in FIG. 7 (e.g., 750, 752, 765, 770, and 790.) Steps in FIG. 7 are further described with reference to elements of FIGS. 1, 3, and 4 with the example of the lost/stolen child as the object of interest.

Method 700 begins at step 750 where message broker 310 of agency B 140 receives an update message from another message broker (e.g., originating agency A 130 or cloud service agent 110) to adapt or incorporate the adaptations to the algorithms and reference data are used to find a lost/stolen child (e.g., the object of interest). Accordingly, one or more software analytics application modules 333 of analytics module 330 of agency B 140 that are associated with the first search request with a current object of interest module (e.g., facial recognition module) are updated as well as reference data module 340 of agency B 140. This is an example of feed forward adaptation and learning as agency B 140 did not identify M1 and/or M2 as potential match images. For example, M1 was not positively confirmed, thus the object of interest image is disassociated with images associated with M1 in reference data module 340. Since M2 was positively confirmed, the object of interest image may be confirmed with images of M2 and additional associations may be established. In addition, updated values of reference data module 340 may be exchanged with analytics module 330 to refine algorithms or train neural nets. Method 700 proceeds to step 752.

At step 752, message broker 310 of agency B 140 transmits the adaptations associated with the first search request to message broker 310 of camera client device 148*a* that uses the algorithms that were updated. For example, camera client device 148*a*'s object of interest module may be a facial recognition module and will receive the transmitted adaptations, feed forward adaptations. The adaptations algorithm and any algorithm updates that agency B 140 made are transmitted from analytics module 330 of agency B 140 to message broker 310 of agency B 140 for publication to agencies or to applicable camera client device 148*a* in agency B 140. Method 700 proceeds to step 765.

At step 765, message broker 310 of agency B 140 receives a confirmation request message associated with the second search request (e.g., based on step 260) as well as a confirmation request message associated with the first search request (e.g., based on step 210). For example, message broker 310 of agency B 140 receives a confirmation message associated with the second search request for potential match image, M5, with the image of the lost/stolen child to confirm that M5 may be a possible match with the object of interest image. Message broker 310 of agency B 140 transmits M5 to analytics module 330 of agency B 140. Various software analytics application modules 333 exchange data with reference data module 340 of agency B 140 to determine whether M5 satisfies a second threshold criteria. Voting module 320 of agency B 140 may apply heuristics or other criteria such as a third threshold criteria to confirm that M5 is a possible hit (e.g., has a probability that satisfies a third threshold criteria and is a likely match of the object of interest image). If a potential match image of M5 is not confirmed, method 700 may remain at step 765 to confirm other potential match images subsequently received, as required. In an example, potential match image M5 is confirmed, and method 700 proceeds to step 770.

Also at step 765, in response to receiving the first search request (e.g., based on step 210), analytics module 330 of agency B 140 may use one or more software analytics application modules 333 to analyze the image file of the object of interest against reference data module 340 (e.g., model database 342, image catalog 344, and/or other data 346a and 346b) of agency B 140 to determine a candidate image that is a close match to the object of interest image file. For a facial recognition analysis, for example, the analysis may include for example, weighing the properties of eye separation, chin-to-nose ratios, permutations, and variations using algorithms to determine whether an image is a candidate image. In an embodiment, other relational information may be accessed including related objects of interest, data mining, beacons, and inference based data (described below).

In an example, a candidate image M6 may be identified and sent to voting module 320 of agency B 140. Based on heuristic or other criteria, voting module 320 may determine that a potential match image M6 is not a potential candidate image because a threshold criterion is not satisfied. Accordingly, reference data module 340 of agency B 140 is updated. For example, the object of interest image is disassociated with other images of the candidate image M6. Method 700 proceeds to step 770.

At step 770, associated with the second search request, message broker 310 of agency B 140 may receive the potential match image M5 confirmation from voting module 320 of agency B 140. Message broker 310 of agency B 140 may determine the originating agency that generated the search request and transmits a possible hit message (e.g., to message broker 310 of originating agency A 130) that includes M5 with corresponding data.

Also at step 770, associated with the first search request, message broker 310 agency B 140 may receive a no-match message from voting module 320 of agency B 140 and transmit the no-match message including M6 to originating agency A 130 (not shown) or cloud service agent 110 (not shown). Method 700 proceeds to step 790.

At step 790, message broker 310 of agency B 140 may receive a voice, video, or text based communication associated with the second search request with regards to the confirmed match of M5 with the lost/stolen child image. In an embodiment, agency B 140 establishes a session with originating agency A 130. In an embodiment, message broker 310 of agency B 140 transmits a communications message to communications resources 175a, 175b, and/or mobile computing device 180 indicating an object of interest hit, where communications resources 175a, 175b, and/or mobile computing device 180 are in proximity to the camera client that captured and/or determined the potential match image, M5.

In addition, agency B 140 may update the algorithm according to the second object of interest hit and update algorithms and/or reference data accordingly. For example, Agency B 140 may transmit the updated algorithm to camera client device 148a that utilizes the algorithm. Method 700 ends.

Figure 8:
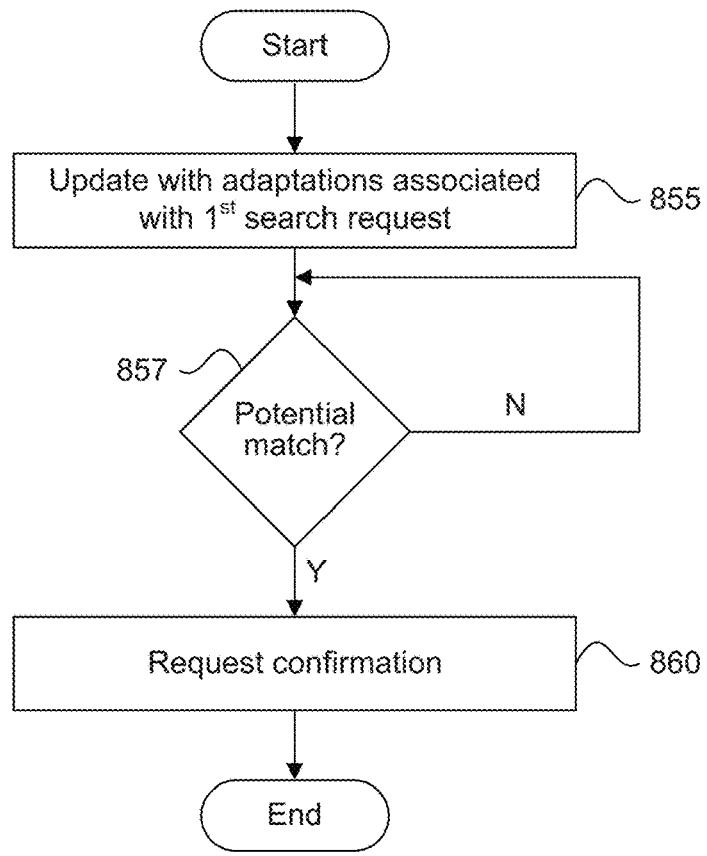
FIG. 8 illustrates a method for a camera client device according to an embodiment.

FIG. 8 illustrates a method for a camera client device 148a according to an embodiment. For ease of discussion and without limitation, method 800 is described with reference to method 200 of FIGS. 2A and 2B. For example, steps in FIGS. 2A and 2B associated with camera client device 148a (e.g., 255, 257, and 260) correspond to the steps in FIG. 8 (e.g., 855, 857, and 860). Steps in FIG. 8 are further described with reference to elements of FIGS. 1, 3, and 4 with the example of the lost/stolen child as the object of interest.

Method 800 begins at step 855, where message broker 310 of camera client device 148a receives and transmits the algorithm adaptations and/or one or more reference data adaptations associated with the first search request from message broker 310 of agency B 140, to analytics module 330 of client camera device 148a. The adaptations are based on feed forward learning as camera client device 148a did not identify M1 or M2 as potential match images. One or more software analytics application modules 333 of analytics module 330 are updated accordingly. Information may be exchanged with reference data module 340 of client camera device 148a to update reference data accordingly. For example, M1 was not positively confirmed, thus the object of interest image may be disassociated with images associated with M1 in reference data module 340. Since M2 was positively confirmed, the object of interest image may be confirmed with images of M2 and additional associations may be established in reference data module 340 as well as in analytics module 330. The adaptations may be due to potential match image confirmations determined in one or more agencies and refine algorithms and/or train neural nets across more than one agency. Method 800 proceeds to step 857.

At step 857, camera client device 148a processes a second search request received (not shown) to find a lost/stolen child (e.g., object of interest). Camera client device 148a utilizes the updated analytics module 330 to analyze the image of the lost/stolen child with updated reference data module 340 to determine a potential match image.

Analytics module 330 of camera client device 148a may use one or more updated software analytics application modules 333 to analyze the image file of the object of interest against updated reference data module 340 (e.g., model database 342, image catalog 344, and/or other data 346a and 346b) of camera client device 148a to determine a candidate image that is a close match to the object of interest image file associated with the second search request. As described earlier, analysis for facial recognition may include for example, weighing the properties of eye separation, chin-to-nose ratios, permutations, and variations using algorithms to determine whether an image is a candidate image. In an embodiment, other relational information may be accessed including related objects of interest, data mining, beacons, and inference based data (described below).

Analytics module 330 may identify a candidate image associated with the second search request, M5, that is sent to voting module 320 camera client device 148a. Voting module 320 may apply heuristics or other criteria to determine that candidate image M5 satisfies a threshold criterion and is considered a potential match image. Accordingly, reference data module 340 and/or software analytics application modules 333 of analytics module 330 are updated with potential match image M5. For example, the object of interest image is associated with other images of the potential match image M5. Method 800 proceeds to step 860.

At step 860, message broker 310 camera client device 148a may transmit potential match image M5 in a confirmation request message associated with the second search request to the originating agency that issued the search request, (e.g., originating agency A 130), cloud service agent 110, or agency B 140. In the example, message broker 310 of camera client device 148a may transmit a confirmation request message including potential match image M5 and corresponding data to message broker 310 of agency B 140. Corresponding data may include other data 346 in reference data module 340 associated with potential match image M5 including but not limited to date and time, camera client ID, camera client location that may be used to display M5 on a visual map. Method 800 ends.

Visual Distress System and Service

Embodiments include a system and method for a visual distress system and service. Embodiments enable a visual search and rescue system when coupled to a panic button or panic alert system. In an embodiment, a user may be registered in a system with an image (e.g., school ID) and have a personal wireless panic button device (e.g., a panic button application mobile computing device 180). The user may activate an alert, and a distress message (similar to a search request) may be received by a panic button alert system agent (e.g., agency B 140) coupled to a database or service where the identity of the user and associated reference images may be sent to message broker 310 of cloud service agent 110 for search and distribution to other agencies (e.g., agency A 130).

Embodiments include utilizing the location of mobile computing device 180 or panic button device, where camera client devices 148a and 148b in proximity may be alerted to the potential presence of an object of interest, and the priority of image processing for recognition purposes may be given priority in relation to memory, processing or storage resource of the camera client device (e.g., camera client device 148a), the camera owning agency (e.g., agency B 140), or cloud service agent (e.g., cloud service agent 110).

Further, beacons that issue distress signals may be used in embodiments where camera client device 148a is equipped with a beacon signal receiver. For example, a beacon may be issued by mobile computing device 180, a beacon enabled device coupled to mobile computing device 180, or a beacon enabled device associated with a user agent. The beacon signal may be received by camera client device 148a where the identity of the beacon signal received is associated with the images captured by camera client device 148a and stored in a database as metadata.

In addition, when camera clients have pan, tilt, and zoom capabilities, embodiments include a control application (e.g., application module 450) that is activated when an object of interest is identified (e.g., a potential match image determined) or a positive confirmation message received (e.g., a hit). Embodiments enable the control application to adjust one or more of the pan, tilt, zoom and/or other capabilities camera client to automatically follow the object of interest.

Inference-Based Object of Interest Confirmation

Embodiments include a system and method for inference-based object of interest confirmation. Embodiments include one or more IVIEWs used for confirming accuracy of objects of interest recognition when coupled to any device or system that broadcasts or responds to a request for identifying information where identifying information (ID) of the device or system is associated with an object of interest by one or more relationship rules (e.g., in reference data module 340) or algorithms (e.g., analytics module 330). Such ID information may be stored in a relational database with an object of interest image or set of related images, and may be further related or associated with additional identifying information stored in other information systems.

For example, a person may be an object of interest associated with mobile computing device 180 (e.g., a cell phone). When mobile computing device 180 transmits a serial number that uniquely identifies mobile computing device 180, the serial number may be received and analyzed by analytics module 330. The serial number is related to a mobile phone number of mobile computing device 180, which is in turn associated with a user name and address. The user name and address information may be associated with an object of interest image, other reference images, and known data. Taken together, the data may be used to increase the likelihood of a positive confirmation or identification of an object of interest.

Embodiments may include an association module (e.g., of analytics module 330) of an IVIEW coupled to external sensors or inputs to select an optimal pattern recognition algorithm of analytics module 330 and/or parameter settings within or with respect to an algorithm of analytics module 330. The external sensors may be detecting devices or systems that provide assistive identification information, including but limited to clocks, alarms, weight sensors, trip sensors, heat sensors, infrared sensors, radar or other forms of electromagnetic radiation sensors, biological or chemical sensors, particle sensors, or sound sensors. The information from these sensors may be correlated with one or images by place, time, associated identifying property or other parameters which may be used for inference-based object of interest confirmation.

System Implementation

Figure 9:
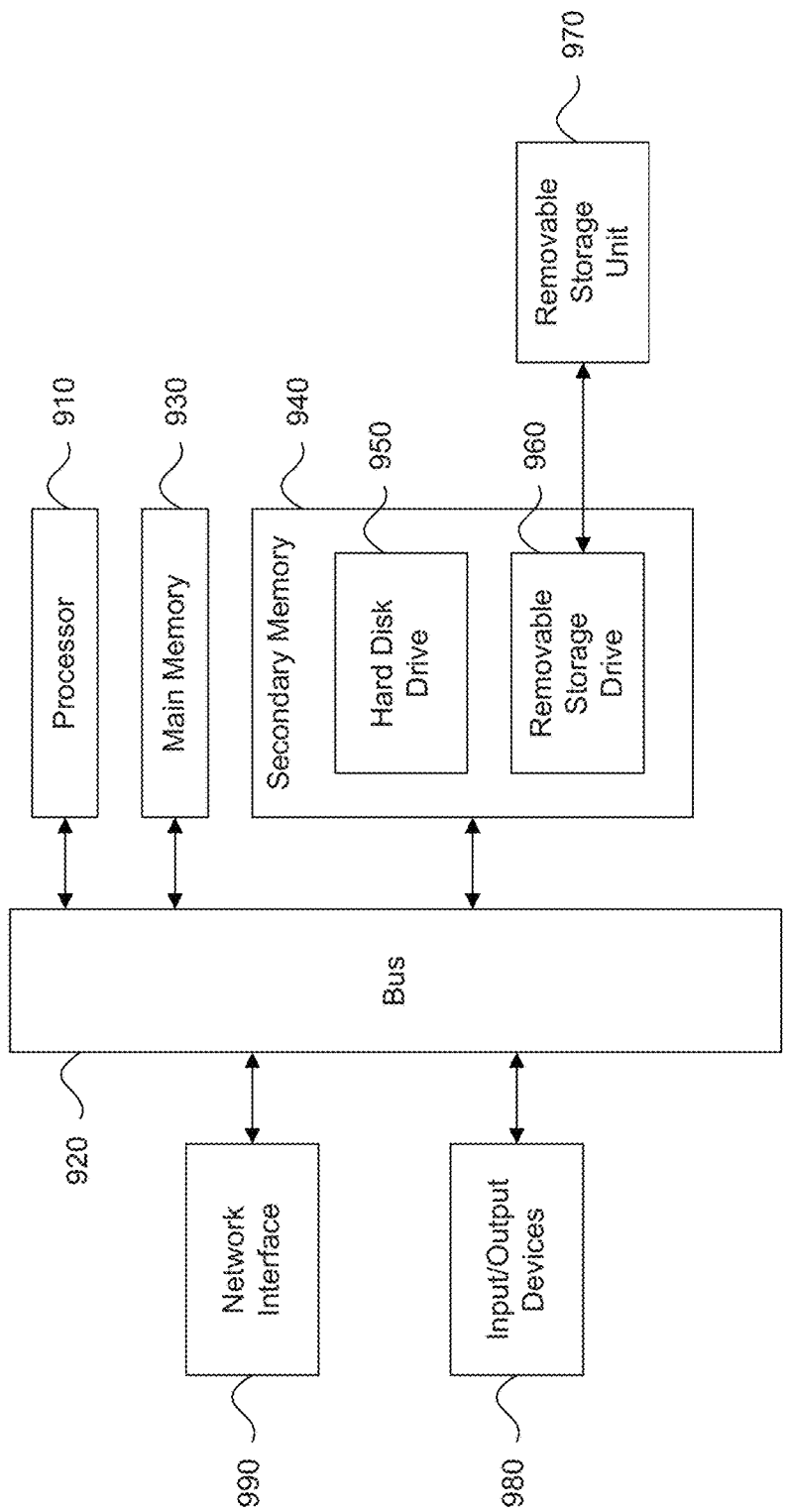
FIG. 9 is an example system useable to implement embodiments.

Various aspects of the embodiments can be implemented by software, firmware, hardware, or a combination thereof. FIG. 9 is an example system 900 (e.g., a computer system) useable to implement embodiments as computer-readable code and/or text-readable code. After reading this description, it will become apparent to a person skilled in the relevant art how to implement the embodiments using other systems and/or processing architectures.

System 900 includes one or more processors (also called central processing units, or CPUs), such as processor 910. Processor 910 is connected to communication bus 920. System 900 also includes a main or primary memory 930, preferably random access memory (RAM). Primary memory 930 has stored therein control logic (computer software), and data.

System 900 may also include one or more secondary storage devices 940. Secondary storage devices 940 include, for example, hard disk drive 950 and/or removable storage device or drive 960. Removable storage drive 960 represents a floppy disk drive, a magnetic tape drive, a compact disk drive, an optical storage device, tape backup, ZIP drive, JAZZ drive, etc.

Removable storage drive 960 interacts with removable storage unit 970. As will be appreciated, removable storage drive 960 includes a computer usable or readable storage medium having stored therein computer software (control logic) and/or data. Removable storage drive 960 reads from and/or writes to the removable storage unit 970 in a well-known manner.

Removable storage unit 970, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

Embodiments may be directed to computer program products or program storage devices having software that enables system 900, or multiple system 900s to perform any combination of the functions described herein.

Computer programs (also called computer control logic) are stored in main memory 930 and/or the secondary storage devices 940. Such computer programs, when executed, direct system 900 to perform the functions of the embodiments as discussed herein. In particular, the computer programs, when executed, enable processor 910 to perform the functions of the present embodiments including FIGS. 5-8, for example. Accordingly, such computer programs represent controllers of system 900.

System 900 also includes input/output/display devices 980, such as monitors, keyboards, pointing devices, etc.

System 900 further includes a communication or network interface 990. Network interface 990 enables system 900 to communicate with remote devices. For example, network interface 990 allows system 900 to communicate over communication networks, such as LANs, WANs, the Internet, etc. Network interface 990 may interface with remote sites or networks via wired or wireless connections. System 900 receives data and/or computer programs via network interface 990.

Conclusion

The embodiments can be implemented with software, hardware, and operating system implementations other than those described herein. Any software, hardware, and operating system implementations suitable for performing the functions described herein can be used.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

The breadth and scope of the present invention should not be limited by any of the above-described exemplary embodiments, but should be defined only in accordance with the following claims and their equivalents.

What is claimed is:

1. A system for a camera client computing device, comprising:
    a memory; and
    one or more processors coupled to the memory, configured to:
        electronically receive a search request message for an object of interest;
        request a pattern recognition algorithm module based on the object of interest;
        in response to the request, receive an object of interest module;
        replace an existing algorithm module with the received object of interest module; and
        execute the object of interest module to analyze the object of interest with reference data,
        wherein the object of interest module and the reference data are adapted according to a confirmation of a first potential match image.

2. The system of claim 1, wherein the one or more processors are further configured to:
    determine a second potential match image;
    update the reference data based on the second potential match image; and
    electronically transmit the second potential match image.

3. The system of claim 2, wherein the one or more processors are further configured to:
    receive a positive confirmation regarding the second potential match image; and
    update the object of interest module based on the positive confirmation received.

4. The system of claim 2, wherein the one or more processors are further configured to: transmit data to a display device, wherein the data comprises a location of the camera client computing device associated with the second potential match image.

5. The system of claim 1, wherein the object of interest module is updated based on a bidirectional feedback mechanism.

6. The system of claim 1, wherein the camera client computing device comprises: a wearable camera or a mobile device.

7. The system of claim 1, wherein the one or more processors are further configured to:
    receive a priority message comprising criteria; and
    based on the criteria, adjust: a camera resolution, a camera speed, or a type of the object of interest.

8. The system of claim 1, wherein the object of interest is an animal, the one or more processors are further configured to:
    use the object of interest module to transform the object of interest based on aging or changes in appearance.

9. The system of claim 1,
    wherein the object of interest is a human, and
    wherein the pattern recognition algorithm module comprises a facial recognition algorithm module.

10. The system of claim 1, wherein the one or more processors are further configured to:
    recognize a concept or context in the search request message; and
    request the pattern recognition algorithm module based on the concept or context.

11. The system of claim 1, wherein the search request message comprises: an originating agency, a date and time of an image of the object of interest, a certain time period, last known location of the object of interest, originating agency communications address and/or routing information, a relational ID, a confirmation and request transaction ID, a stored or preformatted formatted message, a message request expiration value, a name, a color, an ethnicity, a gender, a height, a material, a related object, a person related to the object of interest, an identifying number, or an identifying feature of the object of interest.

12. The system of claim 1, wherein the search request message comprises a first and a second time period, the one or more processors are further configured to:
execute the object of interest module for a duration of the first time period;
after the first time period, request a second pattern recognition algorithm module for a second object of interest;
in response to the request for the second pattern recognition algorithm module, receive a second object of interest module corresponding to the second time period; and
execute the second object of interest module for a duration of the second time period.

13. A method for a camera client, comprising:
electronically receiving a search request message for an object of interest;
requesting a pattern recognition algorithm module based on the object of interest;
in response to the requesting, receiving an object of interest module;
replacing an existing algorithm module with the object of interest algorithm module; and
executing the object of interest module to analyze the object of interest with reference data,
wherein the object of interest module and the reference data are adapted according to a confirmation of a first potential match image.

14. The method of claim 13, further comprising:
determining a second potential match image;
updating the reference data based on the second potential match image; and
electronically transmitting the second potential match image.

15. The method of claim 14, further comprising:
receiving a positive confirmation regarding the second potential match image and the object of interest; and
updating the object of interest module based on the positive confirmation received.

16. The method of claim 14, further comprising:
transmitting data to a display device,
wherein the data comprises a location of the camera client associated with the second potential match image.

17. The method of claim 13, further comprising: updating the object of interest algorithm based on a bidirectional feedback mechanism.

18. The method of claim 13, further comprising:
receiving a priority message comprising criteria; and
in response to the criteria, adjusting: a camera resolution, a camera speed, or a type of the object of interest.

19. The method of claim 13, further comprising:
wherein the object of interest is an animal, transforming the object of interest based on aging or changes in appearance.

20. A non-transitory computer-readable medium having instructions stored therein, which when executed by a processor cause the processor to perform operations, the operations comprising:
electronically receiving a search request message for an object of interest;
requesting a pattern recognition algorithm module based on the object of interest;
in response to the requesting, receiving an object of interest module;
replacing an existing algorithm module with the received object of interest module; and
executing the object of interest module to analyze the object of interest with reference data,
wherein the object of interest module and the reference data are adapted according to a confirmation of a first potential match image.

* * * * *